(12) United States Patent
Yuan et al.

(10) Patent No.: US 7,787,459 B2
(45) Date of Patent: Aug. 31, 2010

(54) METHOD AND SYSTEM FOR IMPLEMENTING TRAVERSAL THROUGH NETWORK ADDRESS TRANSLATION

(75) Inventors: Li Yuan, Guangdong (CN); Jun Yan, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 457 days.

(21) Appl. No.: 10/584,212

(22) PCT Filed: Dec. 24, 2004

(86) PCT No.: PCT/CN2004/001516

§ 371 (c)(1),
(2), (4) Date: Feb. 27, 2007

(87) PCT Pub. No.: WO2005/062546

PCT Pub. Date: Jul. 7, 2005

(65) Prior Publication Data

US 2007/0217407 A1    Sep. 20, 2007

(30) Foreign Application Priority Data

Dec. 24, 2003    (CN) .................. 2003 1 0121080

(51) Int. Cl.
*H04B 3/20*    (2006.01)
(52) U.S. Cl. .................. 370/392; 370/352; 370/401
(58) Field of Classification Search .......... 370/401.389, 370/401.392
See application file for complete search history.

(56) References Cited

U.S. PATENT DOCUMENTS

| | | | |
|---|---|---|---|
| 7,043,564 B1 * | 5/2006 | Cook et al. ................ 709/246 |
| 7,050,422 B2 * | 5/2006 | Xu et al. .................... 370/352 |
| 7,146,410 B1 * | 12/2006 | Akman ..................... 709/220 |
| 7,200,139 B1 * | 4/2007 | Chu et al. .................. 370/352 |
| 7,219,161 B1 * | 5/2007 | Fagundo et al. ........... 709/245 |
| 7,315,888 B2 * | 1/2008 | Shibata ..................... 709/223 |
| 7,512,708 B2 * | 3/2009 | Read ......................... 709/245 |
| 2002/0006780 A1 * | 1/2002 | Bjelland et al. ............ 455/406 |
| 2002/0141390 A1 * | 10/2002 | Fangman et al. .......... 370/352 |
| 2002/0150083 A1 * | 10/2002 | Fangman et al. .......... 370/352 |
| 2003/0048780 A1 | 3/2003 | Phomsopha |
| 2003/0058839 A1 * | 3/2003 | D'Souza ................... 370/352 |
| 2003/0093563 A1 | 5/2003 | Young et al. |
| 2004/0095913 A1 * | 5/2004 | Westphal .................. 370/338 |
| 2009/0028146 A1 * | 1/2009 | Kleyman et al. .......... 370/389 |

FOREIGN PATENT DOCUMENTS

| | | |
|---|---|---|
| GB | 2369746 A | 6/2002 |
| WO | WO 03030463 (A1) | 4/2003 |

* cited by examiner

*Primary Examiner*—Huy D Vu
*Assistant Examiner*—Zewdu Beyen
(74) *Attorney, Agent, or Firm*—Conley Rose, P.C.; Grant Rodolph

(57) ABSTRACT

The present invention discloses a method for implementing traversal through network address translation. The method adopts a FULL PROXY mode for implementing traversal through Network Address Translation (NAT) server or Firewall (FW) by simultaneously relaying call signalings and media streams from a user terminal in a private network. Meanwhile, a system for implementing traversal through network address translation is disclosed. In accordance with this invention, no reconstruction of existing NAT/FWs and user terminals are needed for implementing traversal in any networking architecture while issues of Quality of Service (QoS), security, and aged mapping list of NAT can be solved.

11 Claims, 3 Drawing Sheets

METHOD AND SYSTEM FOR IMPLEMENTING TRAVERSAL THROUGH NETWORK ADDRESS TRANSLATION

CROSS-REFERENCE TO RELATED APPLICATIONS

This application is a National Stage of Patent Cooperation Treaty (PCT) Application No. PCT/CN2004/001516, filed Dec. 24, 2004, entitled, A METHOD FOR ACHIEVING THE CONVERSION AND TRAVERSE OF NETWORK ADDRESS AND SYSTEM THEREOF, which claims priority to Chinese Patent Application No. 200310121080.8, filed Dec. 24, 2003, all of the disclosure of which are hereby incorporated by reference in their entirety.

BACKGROUND OF THE INVENTION

Field of the Invention

NGN is a milestone in the history of telecommunications, which marks the arrival of a new generation of telecommunication network. From a viewpoint of development, NGN is a kind of network which gradually converts from a traditional Public Switched Telephone Network (PSTN) adopting circuit switched technique to a packet-switched network. The NGN bears all the services of the PSTN, and shifts a mass of data transmission to an Internet Protocol (IP) network for reducing heavy load of the PSTN, thus it enhances the performance of many services, no matter new or old, with the help of new features of IP technology. In this sense, NGN is the result of integration of voice PSTN based on Time Division Multiplexing (TDM) and packet networks based on Internet Protocol/Asynchronous Transmission Mode (IP/ATM), which makes it possible to implement integrated services of voice, video, and data on a new generation network. At present, the NGN has become a focus of research.

The NGN may be divided into four layers in terms of functions, i.e., access and transmission layer, media transfer layer, network control layer, and network service layer. A SoftSwitch provides the NGN with the function of call control and connection control of services with real-time requirement, which forms the key portion of call and connection of NGN. A SoftX is a key member of the network control layer of NGN and is a device to provide integrated services and call control, of which the main functions include, call control, signaling gateway, gateway control, integrated services, and enhancing services.

As the NGN is put into commercial use from experiment, access of NGN subscribers becomes an increasingly severe problem. Since the NGN is a network born by a packet network, accessing subscribers are all addressed by IP addresses. However, the to reasons as shortage of IP addresses on existing public networks as well as security, a large number of Enterprise and Premise networks adopt private IP addresses to access a public network via a Network Address Translation (NAT) server or a Firewall (FW). In the following, a Network Address Translation server or a Firewall is denoted as NAT/FW for convenience.

At present, however, in an NGN, when IP is adopted as the bearer of voice and video protocols such as H.323, Session Initiation Protocol (SIP), Media Gateway Control Protocol (MGCP), and H.248, since there are addresses in the load of a message that are different from addresses in the message header, it is impossible for a control channel/media channel of these protocols to traverse traditional NAT/FW devices and interwork with a public network. The specific reasons may be presented through the following analysis of NAT/FW:

A firewall, i.e., FW, is used for limiting entries of packets into a network. Typically, some packet filtering principles are set, and the FW may detect conformity of the packets with the filtering principles by checking the source address, the designation address, the source port, the designation port, and the protocol of each of the packets. Only when the packets are in agreement with the filtering principles would they be permitted to pass the firewall. In practical applications, servers needing to be accessed by the outside, such as Web servers, are usually placed inside a firewall. Then, the firewall could be configured to allow passing of all the packets sent to the ports of these servers. In multimedia communications, however, even if a firewall allows the entering of packets sent to a fixed port that originally set up a call, since audio/video communications need to set up channels for transmitting and receiving data by assigning ports dynamically, which involves a larger range of addresses and ports, it is unable to learn in advance the information of IP addresses and ports of internal terminals, and it is impossible for the firewall to open a large filtering range for the packets without regarding the security of the local area network.

On the other hand, there exist some reasons related with NAT:

A NAT is used for shielding IP addresses of a Local Area Network (LAN) and protecting mainframes of the LAN from being attacked from the outside. As the addresses used inside a LAN can not be addressed in a public network, when the designation address of a packet is an internal address of the LAN, the packet has to be discarded. In multimedia communications, if the address of the called party of H.323 is a LAN address, it is impossible for the packets of this call to reach a terminal inside the LAN. When a call is sent from inside the LAN to the outside, the IP address of the calling party, i.e., an IP address of the LAN, and the port information thereof will be loaded in the data packet. After receiving the packet, the called party may send audio and/or video streams according to the source IP address and port in the load of the packet. When this IP address is an IP unable to be used for route addressing, that is, when the circumstance that the IP address of the LAN is unable to be used for route addressing occurs, routers over the Internet have to discard packets with this IP address. As a result, although it seems apparent that the call has been established, terminals inside the NAT are actually unable to receive audio and video streams from external terminals. Besides, the NAT is adopted to perform network address/port translation so as for multiple terminals in a LAN to share a smaller number of IP addresses of a public network, e.g., when a terminal in a LAN is executing an application, the IP address and port thereof in the LAN are mapped into the external network IP address and port of a gateway. In multimedia communications, only when the channel of a multimedia stream is set up from inside to outside will a NAT device be able to establish a mapping relation for corresponding ports, and thus, the multimedia stream that is transferred to the external network IP address of the gateway could be transferred correctly to the terminal in the LAN. If the channel of a multimedia stream is set up from outside to inside, a NAT device could not be able to establish a mapping relation, and the transmission of the multimedia stream will fail. Moreover, in case that the channel is maintained with a mechanism of time-out, and there is no data being transferred during the period of time-out, the mapping relation will be cancelled. In multimedia communications, when it is needed to suspend the transmission of multimedia data in the channel for a long time, certain measures would be needed to maintain the setup state of the channel.

The problem why audio and/or video services are not able to traverse the NAT/FW is presented above. However, since one of the main advantages of the NGN is to provide subscribers with abundant services of various types, especially integrated services of voice, data, and video for enterprise subscribers, a solution for the above problem is more pressing, and this problem has so far become the largest obstacle to the promotion of NGN services. On the other hand, since most broadband access networks are not part of the network of an operator, it is impossible for the operator to give uniform planning for the broadband access networks, and it is difficult to solve the issues such as IP addresses of an access network, Quality of Service (QoS), security, and differentiation of real-time session services with data services, which have become significant matters worrying the network operators.

Presently, approaches in prior art of the industry include an Application Layer Gateway (ALG) mode, a Middlebox Communication (MIDCOM) mode, a Simple Traversal of User Datagram Protocol (UDP) Through Network Address Translators (STUN) mode, and a Traversal Using Relay NAT (TURN) mode.

A brief description is hereinafter given to the above approaches in prior art.

The first is an ALG mode. An ordinary NAT implements address translation by modifying the address information in the header of a UDP or Transfer Control Protocol (TCP) message. Some applications bearing on TCP/UDP, however, e.g., "end-to-end" applications such as performing multimedia conversation, file sharing, and games, need to carry address information in the load of TCP/UDP message. Usually, the application writes its own address in the load of TCP/UDP message, and this address information is modified into an external address on the NAT when the information passes the NAT, which is commonly mentioned as the ALG mode.

At present, functions of the ALG mode mainly reside in some NAT/Firewall devices which are required to possess the intelligence of identifying applications. Meanwhile, every newly-added application requires an updating of the NAT/Firewall.

In terms of applications of NGN services, the ALG mode has to support the identification of Voice over IP (VoIP) protocol and video protocols such as H.323, SIP, and MGCP/H.248 as well as support the control of NAT/Firewall so as to ensure the smooth traverse of NGN services.

The key point of the ALG mode is: internal terminals of an Enterprise/Premise network are able to breakthrough NAT/ALG devices to register on the SoftX of a public network, and then the SoftX could perform protocol analysis and call processing. Since the SoftX of the public network and the enterprise terminals perform interaction by means of SIP/H.323/H.248, the NAT/ALG devices have to recognize signalings of SIP/H.323/MGCP/H.248 to form channels for multimedia streams and provide support for the smooth traverse of the multimedia streams through NAT/FW.

The ALG mode is the simplest approach to support NGN applications. Unfortunately, since a large number of NAT/FW devices not supporting NGN service applications have been deployed on the networks, this approach is inapplicable.

The second is a MIDCOM mode. What is different from the ALG mode is the architecture of the MIDCOM mode comprises a mechanism of controlling the Middlebox by means of an authentic third-party MIDCOM agent, and the intelligence of application recognition is transferred to an external MIDCOM agent. Therefore, the application protocol is transparent to the Middlebox.

Since the intelligence of application recognition is transferred from the Middlebox to an external MIDCOM agent, according to the architecture of the MIDCOM, without modifying the basic features of the Middlebox, more new services will be sustained by updating the MIDCOM agent, which is a prominent advantage compared with the ALG mode.

In practical applications of NGN services, the function of Middlebox may reside in NAT servers or FWs (NAT/FWs) while the function of MIDCOM agent may reside in SoftXs. As a MIDCOM agent in the SoftX is employed to implement recognition of VoIP and video protocols such as H.323, SIP, MGCP/H.248 as well as implement control of NAT/FWs, the MIDCOM mode may be taken as a solution to the traversal of NGN services through NAT/FW.

The key of the MIDCOM mode is: the SoftX in a public network performs control on NAT/FW devices at the edge of private networks, and identifies SIP/H.323/MGCP/H.248 protocols at the calling and called sides. If both the calling and called party are subscribers of the same intraoffice, the SoftX needs to control the NAT/FWs at both sides of the calling and the called party by means of the MIDCOM protocol so that a media stream could traverse the NAT/FW smoothly after a channel of the media stream is set up on the NAT/FW.

As the SoftX has implemented the recognition of SIP/H323/MGCP/H248, the only need is to add the MIDCOM protocol onto the NAT/FW device, and later on, the recognition of new applications will be provided as long as these applications are supported by the SoftX. Therefore, this approach is a relatively promising solution except that the existing NAT/FW devices have to be updated to support the MIDCOM protocol.

The third is a STUN mode. Another idea for solving the NGN NAT issue is: a user terminal in a LAN obtains in advance an external address of an exit NAT corresponding to the internal address, and then this external address of the exit NAT rather than the IP address of this user terminal in the LAN will be directly written as the address information described in the message load. Thus, there is no need to modify the contents in the message load when the message passes the NAT but only to translate the IP address in the message header following the common NAT procedure, and the IP address information in the load is consistent with the IP address information in the message header. That is how the STUN protocol solves the problem of converting application layer addresses.

With the STUN mode, the application of a subscriber, as a STUN client, sends a STUN request message to a STUN server outside the NAT via the UDP, and the STUN server receives the request message and produces a response message which carries the source port information of the request message, i.e., the external port information of the NAT corresponding to the STUN client. Then, the response message is sent to the STUN client via the NAT, and the STUN client learns its corresponding external address on the NAT through the contents of the response message and fills this external address into the UDP load of later-on call protocols to tell the opposite end that the receiving address and port number of Real-time Transfer Protocol (RTP) of this end is the address and port number outside the NAT. Since the NAT mapping list items of media streams have been established in advance on the NAT by means of the STUN protocol, media streams could be able to traverse through the NAT smoothly.

The most significant advantage of the STUN protocol is that there is no need to make any modification on the existing NAT/FWs. Since there have been large numbers of NAT/FWs in the existing networks and such NAT/FWs can not support Voice over IP (VoIP) applications, if the MIDCOM or NAT/ALG mode is employed to solve the problem of traversal, the existing NAT/FWs have to be replaced, which is not easy. If the STUN mode is employed, the existing NAT/FWs need not be changed, which is the biggest dominance of this mode, and it can be applied in the network environment with multiple NATs connected in series, while the MIDCOM mode is unable to have an effective control on multi-level NATs.

The STUN mode requires the STUN server be placed in the public network, i.e., in the SoftX of the public network. Since the NAT mapping list items of media streams have been established in advance on the NAT by means of the STUN protocol, media streams could be able to traverse through the NAT smoothly.

The limitation of the STUN mode is that it requires applications to support the STUN CLIENT functions, i.e., the network terminals of NGN are demanded to support the STUN CLIENT functions. Meanwhile, the STUN mode is not suitable for the traversal through TCP connections, e.g., it can not support the application protocol of H.323. In addition, the STUN mode does not support the traversal of NGN services through a firewall, nor does it support the traversal through a NAT with a symmetrical type.

The fourth is a TURN mode. Similar to the STUN mode, the idea of solving the NAT issue by the TURN mode is that a subscriber accessing the public network via a private network obtains in advance the address of the public network corresponding to the private address thereof, and then this address of the public network is written as the address information described in the message load. The difference between the STUN mode and the TURN mode lies in that the address obtained in advance in the STUN mode is the address of an exit NAT while that obtained in the TURN mode is the address of the TURN server.

A model of the TURN application is shown as FIG. 1. A system implementing the TURN mode includes packet user terminals 10 and 11, NAT/FWs 20 and 21, SoftXs 40 and 41, as well as a TURN SERVER 50. Addresses and ports in the TURN SERVER are assigned as the external receiving addresses and ports of TURN CLIENTS, i.e., all the messages from the user terminals in the LAN may be relayed and forwarded via the TURN SERVER, which, worth noting, is the most significant difference between the STUN mode and the TURN mode. Besides the virtues of the STUN mode, the TURN mode would solve the problem of the STUN mode on supporting traversal of the applications through symmetric NATs and firewall devices, i.e., it is able to implement traversal through any types of NATs in an Enterprise/Premise network. In addition, the TURN mode supports applications based on TCP, such as H.323 protocol. Furthermore, it is the TURN SERVER that controls the assignment of addresses and ports, which makes it possible to assign Real-time Transfer Protocol/Real-time Transfer Control Protocol (RTP/RTCP) addresses as receiving addresses of clients at this end, where a port number of RTCP is the port number of RTP plus 1, thereby avoiding the random assignment of RTP/RTCP addresses in the STUN mode which may result in that the clients are unable to receive the RTCP messages sent from an opposite end.

The limitation of TURN is that it requires terminals to support TURN CLIENT, which is the same as the STUN mode for network terminals. Apart from that, all messages should be forwarded via a TURN SERVER, and thus, it is more likely to delay and lose packets.

SUMMARY

This invention is to provide a method and system for implementing traversal through network address translation (NAT) so that no reconstruction of existing NAT/FWs and user terminals is needed for traversal in any networking forms.

The method for implementing traversal through NAT includes the steps of:

when a proxy server outside a Network Address Translation (NAT) server or a Firewall (FW) receives a signaling message from a packet user terminal in a first network, the proxy server analyzing the information loaded in the signaling message, recording the address and port of the call signaling and the address and port of Real-time Transfer Protocol (RTP) and Real-time Transfer Control Protocol (RTCP) of media stream loaded in the message, modifying the address and port of call signaling loaded in the message into the address and port of call signaling of a second network assigned for this call by the proxy server, and modifying the address and port of RTP and RTCP of media stream loaded in the message into the address and port of the second network assigned for the media stream by the proxy server;

the proxy server delivering the modified signaling message to a processing device of packet voice signaling or a service processing device;

when receiving a response signaling message sent to the packet user terminal in the first network, the proxy server analyzing the information loaded in the response signaling message, modifying the address and port of response signaling in the information loaded in the message into the recorded address and port of call signaling, and modifying the RTP and RTCP address and port of media stream loaded in the message into the recorded RTP and RTCP address and port of media stream;

the proxy server sending the modified response signaling message to the packet user terminal in the first network.

A system provided in this invention for implementing traversal through Network Address Translation (NAT) includes:

a packet user terminal located in a first network, for initiating and receiving services;

a proxy server located in a second network, for receiving signaling messages from the packet user terminal in the first network, analyzing the information loaded in the signaling message, recording the address and port of call signaling loaded in the message as well as the address and port of media stream thereof, modifying the address and port of call signaling loaded in the message into the address and port in the second network assigned for this call by the proxy server, and modifying the address and port of media steam loaded in the message into the address and port of the second network assigned for the media stream by the proxy server before sending the modified signaling message to a soft-switching device;

when receiving a response signaling sent to the packet user terminal in the first network, the proxy server analyzes the information in the message load of the response signaling, modifies the address and port of response signaling in the message load into the recorded address and port of call signaling, and modifies the address and port of media stream carried in the message load into the recorded address and port of media stream before sending the modified response signaling to the packet user terminal in the first network; and the soft-switching device, which is for providing integrated services and call control, forwarding to the proxy server the response signaling message sent to the packet user terminal when the response message is received.

It can be seen by comparison that the difference between the present invention and the prior art lies in that a proxy server is employed in this invention for traversal through NAT/FWs, and the proxy server converts not only the address/port in the IP header of a message but also the signaling address/port carried in the message as well as the RTP/RTCP address/port.

The difference of the present invention comparing with the prior art is likely to bring visible benefits, i.e., the solution of this invention requires no reconstruction or modification on NAT/FW devices or service terminals; implements traversal through multi-layer NATs and symmetric NATs as well as through exit NAT/FWs of multiple Enterprise/Premise networks; provides control function for user access, provides encryption for QoS labels and information of media streams, guarantees the QoS of real-time session services of access network and the security thereof, and at the same time, provides the function of updating the NAT mapping table and the function of flow-based charging.

EMBODIMENTS OF THE INVENTION

Detailed descriptions for embodiments of this invention are hereinafter given with reference to the accompanying drawings.

In an embodiment of this invention, a FULL PROXY mode is adopted and the traversal through an exit NAT/FW is implemented by simultaneously relaying the call signaling and the media stream of a user terminal within a private network.

Figure 1:
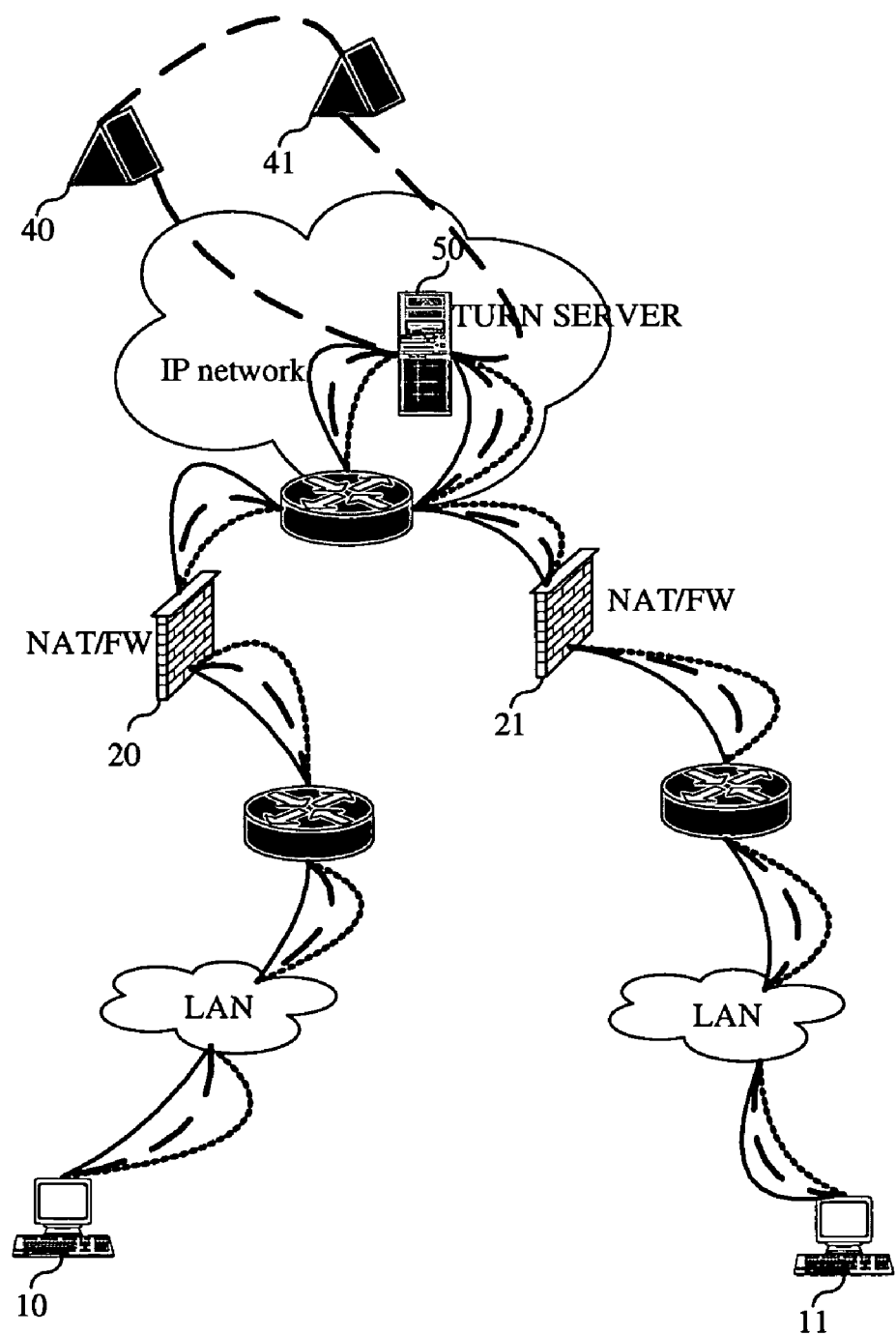
FIG. 1 shows a system architecture in the TURN mode.
Figure 2:
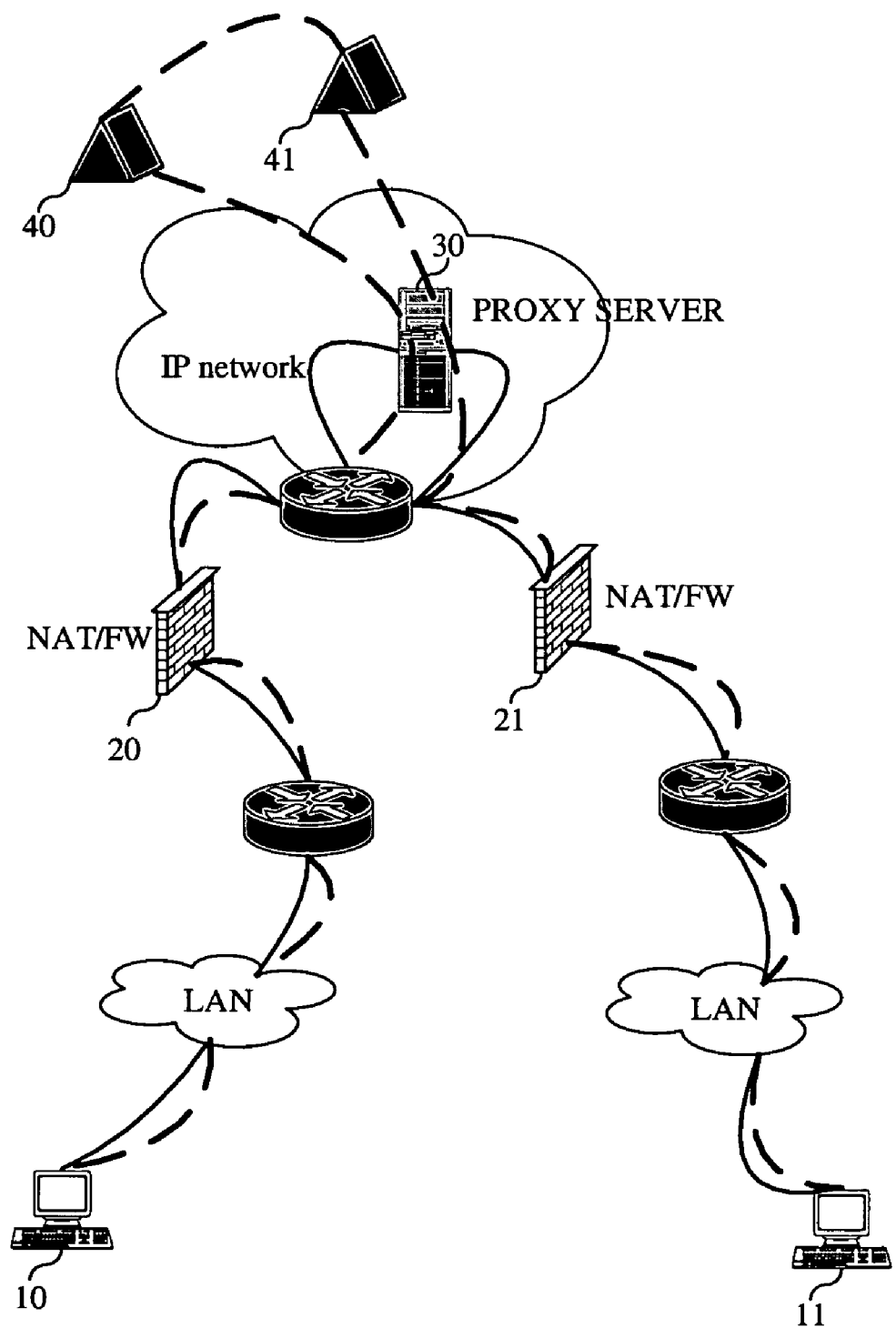
FIG. 2 shows a system architecture in the FULL PROXY mode in accordance with an embodiment of the present invention.

FIG. 2 is a schematic diagram illustrating an architecture of an embodiment of the system in the FULL PROXY mode in accordance with an embodiment of the present invention. For the sake of highlighting this embodiment, only portions closely related to the embodiment are shown in FIG. 2.

As shown in FIG. 2, the system in this embodiment includes packet user terminals 10 and 11, NAT servers or FWs (NAT/FWs) 20 and 21, a proxy server 30, soft-switching devices (SoftX) 40 and 41. Here, the packet user terminals 10 and 11 belong to different networks, and are connected with the PROXY SERVER 30 via the NAT/FWs 20 and 21, respectively; and the PROXY SERVER 30 is connected with the SoftXs 40 and 41. In the FIG. 2, solid lines represent media streams while dotted lines represent signaling streams.

The packet user terminals 10 and 11 refer to user terminals communicating by means of audio/video protocols, such as H.323, SIP, MGCP, and H.248. The packet user terminals are initiators and receivers of multimedia services, and when they are in a private network, they can access a public network via the NAT/FWs 20 and 21, respectively. It should be noted that the private network and the public network mentioned in this invention are only specific cases while, in fact, the present invention is applicable to any two networks, e.g., different LANs, or one is a LAN and the other is an external public network. When one network is within a NAT/FW, it is considered as a private network, while the other network outside the NAT/FW is considered as a public network.

The NAT/FWs 20 and 21 refer to devices for implementing functions of NAT and Firewall, which are typically configured at the position where a private network is connected with a public network. On one hand, the NAT/FWs function to prevent data packets from entering the private network unlimitedly, and protect mainframes of the private network from being attacked by the outside; on the other hand, they shield IP addresses of the private network through translation of network addresses and/or ports so that multiple user terminals in the private network could share a small number of IP addresses of the public network.

The PROXY SERVER 30, which is similar to a TURN SERVER in prior art, is configured in the convergence layer of a metropolitan area network (MAN) for implementing functions of FULL PROXY, i.e., functions of signaling agent and media relay. Specifically, when receiving a signaling message from the packet user terminal 10, the PROXY SERVER 30 analyzes and processes the load of the signaling message, and obtains the address/port in the IP header of the signaling message, the address/port of the call signaling in the load of the signaling message as well as the address/port of the user terminal for receiving media streams, where the addresses/ports are addresses/ports of the private network. In addition, the PROXY SERVER 30 assigns call signaling addresses/ports of the public network for the signaling message, the call signaling in the load of the signaling message, and the user terminal to receive media streams, respectively, and records the corresponding relations between the private-network addresses/ports and the public-network addresses/ports depicted above.

Thereafter, modify the address/port in the IP header of the signaling message into the address/port of signaling message in the public network assigned for the call by the PROXY SERVER 30, modify the address/port of the call signaling in the load of the signaling message into the address/port of the public network assigned for the call by the PROXY SERVER 30, and modify the address/port of the media stream in the load of the signaling message into the address/port of the public network assigned for the media stream by the PROXY SERVER 30. After address modification, send the signaling message to the SoftXs 40 and 41. When receiving the signaling message sent from the SoftXs 40 and 41 to the packet user terminal 10, the PROXY SERVER 30 obtains the address/port of the private network corresponding to the address/port in the IP header of the signaling message, the call signaling address/port of the private network corresponding to the call signaling address/port in the load of the signaling message, and the media stream address/port of the private network corresponding to the media stream address/port in the load of the signaling message according to the recorded corresponding relations in the PROXY SERVER 30 itself, and modifies the address/port in the IP header of the signaling message into the address/port of the IP header of signaling message in the private network, modifies the call signaling address/port in the load of the signaling message into the call signaling address/port in the private network, modifies the media stream address/port carried in the signaling message into the media stream address/port in the private network, and then forwards the message according to the modified address in the IP header of the signaling message. In this way, call signalings and media streams can be transfered via the PROXY SERVER 30 between a calling party and a called party.

It is understood by persons skilled in the art of this invention that the PROXY SERVER 30 may configure multiple pairs of IP addresses. If multiple private-network IP addresses or public-network IP addresses have been configured on the PROXY SERVER 30, traversal through exit NAT/FWs of multiple Enterprise/Premise networks or proxy of multiple SoftXs may be implemented at the same time with one device. This approach ensures that media streams are correctly forwarded whichever networking mode the PROXY SERVER 30 is in and whether or not the NAT is symmetric.

In addition, by the analysis and processing for the signalings, the PROXY SERVER 30 not only learns the conditions of address translation in a session, but also obtains the QoS information, such as bandwidth demand. Thus, the PROXY SERVER 30 is able to control the enabling and disabling of the pass of media streams through state information of the session so as to protect the network and prevent the bandwidth from being thieved. The PROXY SERVER 30 can provide functions of user access control, bandwidth management, and encryption for the QoS label of media stream as well as the label and information of Virtual Local Area Network (VLAN).

In order to prevent the aging of a NAT mapping list, this invention also introduces a periodical updating mechanism for address binding relations of NAT, i.e., after analyzing the signaling and obtaining the address, the PROXY SERVER 30 will periodically send a message to the packet user terminal 10 to refresh the mapping relations of signaling addresses on the exit NAT/FW 20 of the enterprise network, where the mapping relations refer to corresponding relations between IP addresses/ports of the private network and IP addresses/ports of the public network assigned by the NAT/FW 20. After implementing the traversal of the signaling address through the exit NAT of the enterprise network, the PROXY SERVER 30 takes a first-packet refreshing approach to update list items of the session or list items of the address translation relation of the media stream for accomplishing media streams interaction, i.e., after the media stream sent from the terminal arrives at the PROXY SERVER 30 before performing translation on the exit FAT/FW 20 of the enterprise network, the PROXY SERVER 30 learns the information of the address/port dynamically assigned on the exit NAT/FW 20 from the first-packet, thereby updates the session list items of the media stream, establishes a complete session list of the media stream, and completes media forwarding when located in the public network and connected to multiple enterprise networks.

After the PROXY SERVER 30 is introduced into the system, as media streams from both the calling party and the called party are relayed via the PROXY SERVER 30, it is possible for the PROXY SERVER 30 to obtain accurate flow volume of the media stream, thereby implementing flow-based charging rather than traditional charging based on time duration.

The SoftXs 40 and 41 are soft switching devices which, as key components in the network control layer of NGN, are adopted to provide integrated services and call control. After receiving signaling messages sent from the public network to a packet user terminal in the private network, the SoftXs 40 and 41 forward the received messages to the PROXY SERVER 30.

The method for trayersing NAT/FW based on the FULL PROXY mode in accordance with the present invention is hereinafter further described with reference to a specific embodiment.

Figure 3:
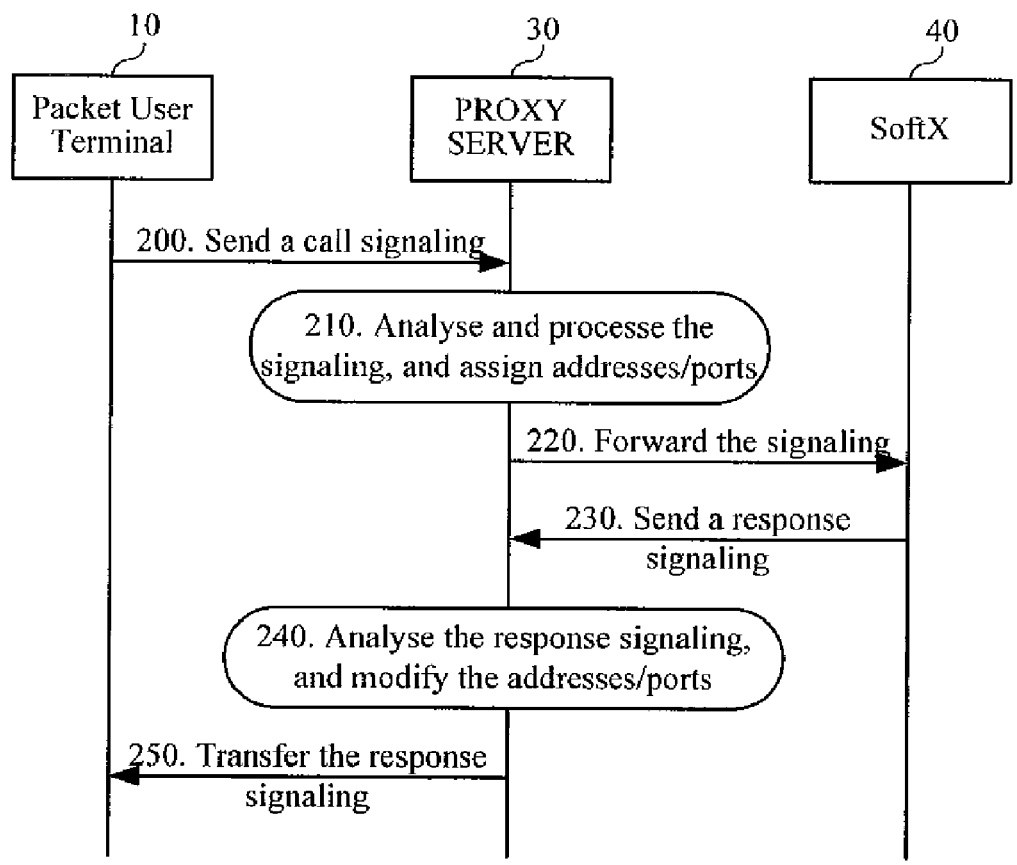
FIG. 3 is a flowchart for implementing NAT/FW traversal in the FULL PROXY mode in accordance with an embodiment of this invention.

As a preferred embodiment of this invention, it is assumed in this embodiment that the packet user terminal 10 initiates a relevant service to the packet user terminal 11, the procedure of which is as shown in FIG. 3:

Step 200: The packet user terminal 10 in a private network sends a signaling message to the PROXY SERVER 30, where the signaling message contains registration and call information, and the source address of the IP header of the signaling message is an address of the private network. The packet user terminal 10 takes the PROXY SERVER 30 as a soft-switching device. Specifically speaking, the signaling message originated from the packet user terminal 10 is first sent to the NAT/FW 20. The NAT/FW 20 assigns an address/port of the public network for the signaling message, changes the source address of the IP header of the message from the address/port of the private network into the address/port of the public network assigned by the NAT/FW 20 itself without any change to the information contained in the message, records the corresponding relation between the above address/port of the private network and the address/port of the public networt assigned by the NAT/FW 20, and then forwards the signaling message to the PROXY SERVER 30.

Step 210: After receiving the signaling message, the PROXY SERVER 30 analyses and processes the information carried in the load of the signaling message, obtains the address/port in the IP header of the signaling message, the address/port of the call signaling in the message load as well as the address/port of the media stream requested by the user terminal, and assigns addresses/ports of the public network for the signaling message, the call signaling as well as the media stream requested by the user terminal, respectively. Thereafter, the PROXY SERVER 30 modifies the address/port in the IP header of the signaling message into the address/port of the public network assigned for the call by the PROXY SERVER 30, modifies the address/port of the call signaling in the message load into the address/port of the call signaling of the public network assigned for the call by the PROXY SERVER 30, modifies the media stream address/port in the message load into the address/port of the public network assigned for the media stream by the PROXY SERVER 30, and records the corresponding relations of the address/port of the IP header of signaling message in the private network, the address/port of the call signaling in the message load, and the address/port of the media stream requested by the user terminal with the addresses/ports in the public network assigned by the PROXY SERVER 30.

Step 220: Forward the signaling message modified in Step 210 to the SoftX 40.

Step 230: When receiving a response signaling message required to be sent to the packet user terminal 10, the SoftX 40 forwards the response signaling message to the PROXY SERVER 30.

Step 240: When receiving the response signaling message being sent to the packet user terminal 10 in the private network, the PROXY SERVER 30 analyzes the information loaded in the response signaling message, obtains the address/port in the IP header of the response signaling message, the address/port of response signaling in the load of the response signaling message, and the address/port of the media stream, then acquires the corresponding IP address/port in the private network, call signaling address/port, and media stream address/port from the self-recorded corresponding relations according to the address/port in the IP header of the response signaling message, the address/port of response signaling in the load of the response signaling message, and the address/port of the media stream, modifies the address/port in the IP header of the response signaling message into the corresponding address/port of the IP header in the private network, modifies the address/port of response signaling in the load of the response signaling message into the corresponding address/port of call signaling in the private network, modifies the address/port of the media stream carried in the response signaling into the corresponding address/port of the media stream in the private network, where the address/port of the media stream may comprise an RTP/RTCP address/port.

By recording and modifying the addresses/ports of the signaling and the media stream in the message load in Step 210 and Step 240, traversal through NAT/FW is implemented while no reconstruction of the existing NAT/FWs and user terminals is needed for the traversal whichever networking mode is hereby adopted.

Step 250: The PROXY SERVER 30 sends the modified response signaling message to the packet user terminal 10 in the private network.

Specifically, the PROXY SERVER 30 first sends to the NAT/FW 20 the modified response signaling message, the designation address of which is the public-network address/port assigned for the call of the packet user terminal 10 by the NAT/FW 20. Then, the NAT/FW 20 searches and finds out the private-network address/port corresponding to the public-network designation address/port of the message from the list of corresponding relations between private-network addresses/ports and public-network addresses/ports recorded in the NAT/FW 20 itself, replaces the public-network designation address/port with the private-network address/port found, and after performing the address/port conversion, forwards the response signaling message to the packet user terminal 10.

As can be seen from the above procedures, the relay of the FULL PROXY mode in accordance with this invention has following distinctions from the TURN mode:

In the TURN mode, addresses/ports are assigned during the interaction between a TURN SERVER and a user terminal via the TURN protocol, and the address information within a message is generated by the terminal. The TURN SERVER processes address translation for the subsequent messages according to the information of the assigned addresses/ports before relaying and forwarding them. When it comes to the FULL PROXY mode, it is the device responsible for relaying messages who analyses and processes the call protocol, modifies the address information of the media stream carried in the message before forwarding the signaling message, and at the same time, makes address translation for media messages according to the modified address information of the media streams before forwarding them.

Though illustration and description of the present invention have been given with reference to preferred embodiments thereof, it should be appreciated by ordinary persons skilled in the art that various changes in form and detail can be made without deviation from the spirit and scope of this invention as defined by the appended claims.

The invention claimed is:

1. A method for implementing traversal through a Network Address Translation (NAT) server or a firewall (FW) located in a first network, the method comprising:
    recording a first address and port in an IP header of a signaling message of a call received from the NAT server or FW located in the first network;
    modifying the first address and port into a second address and port assigned by the proxy server for the call in the second network;
    analyzing the information in the signaling message;
    recording an address and port of a call signaling in a payload of the signaling message; and
    Recording an address and port of Real-time Transfer Protocol (RTP) and Real-time Transfer Control Protocol (RTCP) of a media stream in the signaling message;
    modifying the address and port of the call signaling into the address and port of the call signaling of the second network assigned by the proxy server for the call;
    modifying the address and port of RTP and RTCP into the address and port of the second network assigned by the proxy server for the media stream;
    delivering the signaling message to a processing device of packet voice signaling or a service processing device in the second network;
    modifying a third address and port in the IP header of a response signaling message from the processing device of packet voice signaling or the service processing device into the first address and port;
    analyzing the information in the response signaling message;
    modifying an address and port of a response signaling in a payload of the response signaling message into the recorded address and port of the call signaling in the payload of the signaling message;
    modifying a RTP and RTCP address and port of a media stream in the response signaling message into the recorded RTP and RTCP address and port of the media stream in the signaling message; and
    sending the response signaling message to the NAT server or FW in the first network,
    wherein the method is implemented in the proxy server located in the second network outside the NAT server or the FW.

2. The method according to claim 1, wherein:
    the first address and port in the IP header of the signaling message is an address and port of a public network assigned by the NAT server or FW; and
    before sending the signaling message, the NAT server or FW:
    modifies a source address and port in the IP header of the signaling message into the address and port of the public network, and
    records a mapping relationship between the source address and port and the address and port of the public network.

3. The method according to claim 1, wherein the first network is a private network, and the second network is a public network.

4. The method according to claim 1, further comprising:
    initiating, by the proxy server, messages periodically to a packet user terminal in the first network, refreshing the mapping relationship recorded on the NAT server or FW.

5. The method according to claim 1, wherein the processing device of packet voice signaling or service processing device is a soft-switching device or a voice over IP gatekeeper device.

6. A system for implementing traversal through a Network Address Translation (NAT) server or a firewall (FW) located in a first network, comprising:
    a packet user terminal located in the first network, for initiating and receiving services;
    the NAT server or FW, for providing services of accessing a second network for the packet user terminal and forwarding messages from and to the packet user terminal;
    a proxy server located in the second network outside the NAT server or FW, the proxy server being configured for:
    receiving a signaling message of a call from the NAT server or FW;
    recording a first address and port in an IP header of the signaling message;

modifying the first address and port into a second address and port assigned by the proxy server for the call in the second network;

analyzing the information in the signaling message, recording an address and port of a call signaling in a lead payload of the signaling message as well as an address and port of a media stream thereof;

modifying the address and port of the call signaling into the address and port in the second network assigned by the proxy server for the call, and modifying the address and port of the media steam into the address and port of the second network assigned by the proxy sever for the media stream; and receiving a response signaling message sent to the packet user terminal;

modifying a third address and port in the IP header of the response signaling message into the first address and port;

analyzing the information in the response signaling message;

modifying an address and port of a response signaling in a payload of in the response signaling message into the recorded address and port of the call signaling;

modifying an address and port of a media stream in the response signaling message into the recorded address and port of the media stream; and delivering the response signaling message to the NAT server or FW; and a soft-switching device, for providing integrated services and call control, forwarding to the proxy server the response signaling message sent to the packet user terminal when the response signaling message is received.

7. The system according to claim 6, wherein the packet user terminal is a user terminal performing audio and video communications by means of H.323 protocol, Session Initiation Protocol (SIP), Media Gateway Control Protocol (MGCP), or H.248 protocol.

8. The system according to claim 6, wherein the proxy server is used for charging based on flow volumes.

9. The system according to claim 6, wherein the proxy server is used for conducting access control of users and bandwidth management, and encrypting Quality of Service labels of media streams, Virtual Private Network labels and information.

10. The system according to claim 6, wherein the proxy server is used for:
configuring multiple pairs of addresses of the first network and the second network, and
implementing traversal through multiple NAT servers or FWs.

11. The system according to claim 6, wherein the proxy server is adapted to:
learn, after the media stream sent from the terminal arrives at the proxy server, the information of the address/port dynamically assigned on the NAT server or FW from a first-packet of the media stream;
update session list items or list items of address translating relation of media streams; and
establish a complete session list of the media stream.

* * * * *

UNITED STATES PATENT AND TRADEMARK OFFICE
CERTIFICATE OF CORRECTION

PATENT NO. : 7,787,459 B2
APPLICATION NO. : 10/584212
DATED : August 31, 2010
INVENTOR(S) : Li Yuan et al.

It is certified that error appears in the above-identified patent and that said Letters Patent is hereby corrected as shown below:

Column 13, claim 6, line 5, delete the word "lead".

Signed and Sealed this

Twelfth Day of October, 2010

David J. Kappos
*Director of the United States Patent and Trademark Office*